United States Patent
Vitucci

(10) Patent No.: US 8,810,414 B2
(45) Date of Patent: Aug. 19, 2014

(54) SITUATIONAL AWARENESS SYSTEM AND METHOD FOR DISCONNECT SWITCHES IN ELECTRICAL SUBSTATIONS

(75) Inventor: Antonio Vitucci, Wauconda, IL (US)

(73) Assignee: Honeywell International Inc., Morristown, NJ (US)

( * ) Notice: Subject to any disclaimer, the term of this patent is extended or adjusted under 35 U.S.C. 154(b) by 155 days.

(21) Appl. No.: 13/238,952

(22) Filed: Sep. 21, 2011

(65) Prior Publication Data

US 2013/0069779 A1 Mar. 21, 2013

(51) Int. Cl.
*G08B 17/00* (2006.01)
*H02H 3/00* (2006.01)
*G01R 31/00* (2006.01)

(52) U.S. Cl.
USPC .............................. 340/584; 361/62; 324/500

(58) Field of Classification Search
USPC .................. 455/419, 404.2; 324/67; 700/295
See application file for complete search history.

(56) References Cited

U.S. PATENT DOCUMENTS

| 4,315,251 | A  | * | 2/1982  | Robinson et al. ........ 340/870.02 |
| 6,005,759 | A  | * | 12/1999 | Hart et al. ........................ 361/66 |
| 7,324,876 | B2 | * | 1/2008  | Ying .............................. 700/295 |
| 7,558,703 | B2 | * | 7/2009  | Stoupis et al. ................ 702/183 |
| 7,925,388 | B2 | * | 4/2011  | Ying .............................. 700/295 |
| 8,335,304 | B2 | * | 12/2012 | Petite ............................ 379/155 |
| 8,380,358 | B2 | * | 2/2013  | Karandikar et al. .......... 700/295 |
| 2006/0084419 | A1 | * | 4/2006  | Rocamora et al. ............ 455/419 |
| 2006/0176630 | A1 | * | 8/2006  | Carlino et al. .................. 361/64 |
| 2007/0063688 | A1 | * | 3/2007  | Nguyen .......................... 324/67 |
| 2007/0144779 | A1 | * | 6/2007  | Vicente et al. ................ 174/520 |
| 2007/0247768 | A1 | * | 10/2007 | Meehleder et al. ............. 361/42 |
| 2008/0255782 | A1 | * | 10/2008 | Bilac et al. ..................... 702/62 |
| 2009/0140871 | A1 | * | 6/2009  | Titus ............................. 340/638 |
| 2009/0244817 | A1 | * | 10/2009 | Moyer .......................... 361/634 |
| 2009/0248329 | A1 | * | 10/2009 | Restrepo ........................ 702/59 |
| 2010/0152914 | A1 | * | 6/2010  | Ying .............................. 700/295 |
| 2010/0179707 | A1 | * | 7/2010  | Cannon et al. ................ 700/295 |
| 2010/0256934 | A1 | * | 10/2010 | Rohrbaugh ..................... 702/62 |
| 2012/0015621 | A1 | * | 1/2012  | Cerny et al. ............... 455/404.2 |

* cited by examiner

*Primary Examiner* — Hai Phan
*Assistant Examiner* — Royit Yu
(74) *Attorney, Agent, or Firm* — Wood, Phillips, Katz, Clark & Mortimer

(57) ABSTRACT

A method and system (30) are disclosed for providing situational awareness to a lineworker executing a switching order in a distribution substation (10). The method includes the steps of wirelessly transmitting a status of at least one circuit breaker (20) in the distribution substation (10), wirelessly receiving the status at a location adjacent a target switch (16) in the distribution substation (10); and displaying the status to a lineworker at the location to allow the lineworker to verify the status immediately prior to executing a switching order for the target switch (16). The system (30) includes a wireless transmitter (32) to perform the transmitting step of the method and one or more wireless receivers (34) to perform the receiving and displaying steps of the method.

12 Claims, 3 Drawing Sheets

SITUATIONAL AWARENESS SYSTEM AND METHOD FOR DISCONNECT SWITCHES IN ELECTRICAL SUBSTATIONS

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD

The disclosure relates generally to systems and methods in connection with electrical distribution substations, and more particularly to systems and methods related to executing switching orders in electrical distribution substations.

BACKGROUND

Indoor or hybrid electrical distribution substations may contain circuit breakers, disconnect panels, protection panels and other assets located at different locations. For example, these assets could be located on different floors or different parts of the same floor.

To ensure lineworker safety, switching orders include steps to verify that a circuit breaker in line with a target disconnect switch is open. These steps are carried out by inspecting circuit breaker indicators and ammeters at the protection panel. Lineworkers then verify the circuit breaker is open at the circuit breaker, where a visual indicator is integrated into the circuit breaker assembly. Finally, the remaining disconnect switches on the feeder are checked to verify they are in the appropriate state before the target switch is opened or closed.

When these assets are out-of-view from each other, such as when the assets are located on different floors or different parts of the same floor, it becomes challenging to execute switching orders. The main issue is not being able to monitor in real time the status of circuit breakers or other assets. In some instances, it is possible to inadvertently open a disconnect switch on a load, which could be hazardous and prone to developing dangerous and potentially fatal arc flashes. In fact, one such incident occurred at a substation in Massachusetts.

It is known to install current measurement devices on high voltage assets, or to use low voltage direct hard wiring between high voltage asset indicators and indicators installed, for example, at disconnect switch panels.

SUMMARY

In accordance with one feature, a method is shown for providing situational awareness to a lineworker executing a switching order in a distribution substation. The method includes the steps of wirelessly transmitting a status of at least one circuit breaker in the distribution substation, wirelessly receiving the status at a location adjacent a target switch in the distribution substation, and displaying the status to a lineworker at the location to allow the lineworker to verify the status immediately prior to executing a switching order for the target switch.

As one feature, the step of wirelessly transmitting includes transmitting the status in a data packet, and the method further includes the step of the decoding the data packet to display the status at the location.

According to one feature, the displaying step further includes displaying at least one additional parameter to the lineworker at the location to allow the lineworker to verify the at least one additional parameter immediately prior to executing a switching order for the target switch.

In one feature, the displaying step includes displaying specific colors of light for each of the status and the at least one additional parameter, each color to indicate a particular condition for each of the status and the at least one additional parameter.

According to one feature, the wirelessly transmitting step includes transmitting a status for each of a plurality of circuit breakers in the distribution substation, and the displaying step includes displaying the status for a specific circuit breaker associated with the target switch.

As one feature, the wirelessly receiving step includes receiving the status for each of a plurality of circuit breakers at a plurality of locations, each location being adjacent one of a plurality of target switches, and the displaying step includes displaying at each location the status for a specific circuit breaker associated with the target switch adjacent the location.

In one feature, the wirelessly transmitting step includes transmitting the statuses in a data packet, and the method further includes the step of decoding the data packet at each location to display the status of the specific circuit breaker associated with the target switch adjacent the location.

According to one feature, the displaying step further includes displaying at least one additional parameter at each location to allow the lineworker to verify the at least one additional parameter immediately prior to executing a switching order for the target switch at each location.

As one feature, the displaying step includes displaying specific colors of light at each location for each of the status and the at least one additional parameter associated with the location, each color to indicate a particular condition for each of the status and the at least one additional parameter.

In accordance with one feature, a situational awareness system is shown to provide situational awareness to a lineworker executing a switching order in a distribution substation. The situational awareness system includes a wireless transmitter to wirelessly transmit a status of at least one circuit breaker in the distribution substation, and a wireless receiver positioned adjacent a target switch in the distribution substation to receive the status transmitted from the wireless transmitter, the wireless receiver including a user interface configured to display the status to a lineworker at the target switch prior to the lineworker executing a switching order for the target switch.

In one feature, the wireless transmitter is configured to transmit the status in a data packet and the wireless receiver is configured to decode the data packet to display the status to the lineworker.

As one feature, the wireless receiver is configured to display at least one additional parameter to a lineworker at the target switch prior to the lineworker executing the switching order for the target switch.

According to one feature, the wireless transmitter is connected to a protection panel and configured to transmit a status for each of a plurality of circuit breakers in the distribution substation, and the system further includes a plurality of wireless receivers, each wireless receiver positioned adjacent one of a plurality of target switches in the distribution substation and configured to receive and display the status for one of the plurality of circuit breakers associated with the one of a plurality of target switches.

In one feature, the wireless transmitter is configured to transmit the statuses in a data packet and each wireless receiver of the plurality of wireless receivers is configured to decode the data packet to display the status for the one of the plurality of circuit breakers associated with the one of a plurality of target switches.

As one feature, each wireless receiver is configures to display at least one additional parameter to a lineworker at the target switch positioned adjacent the wireless receiver.

Other features and advantages will become apparent from a review of the entire specification, including the appended claims and drawings.

DETAILED DESCRIPTION

Figure 1:
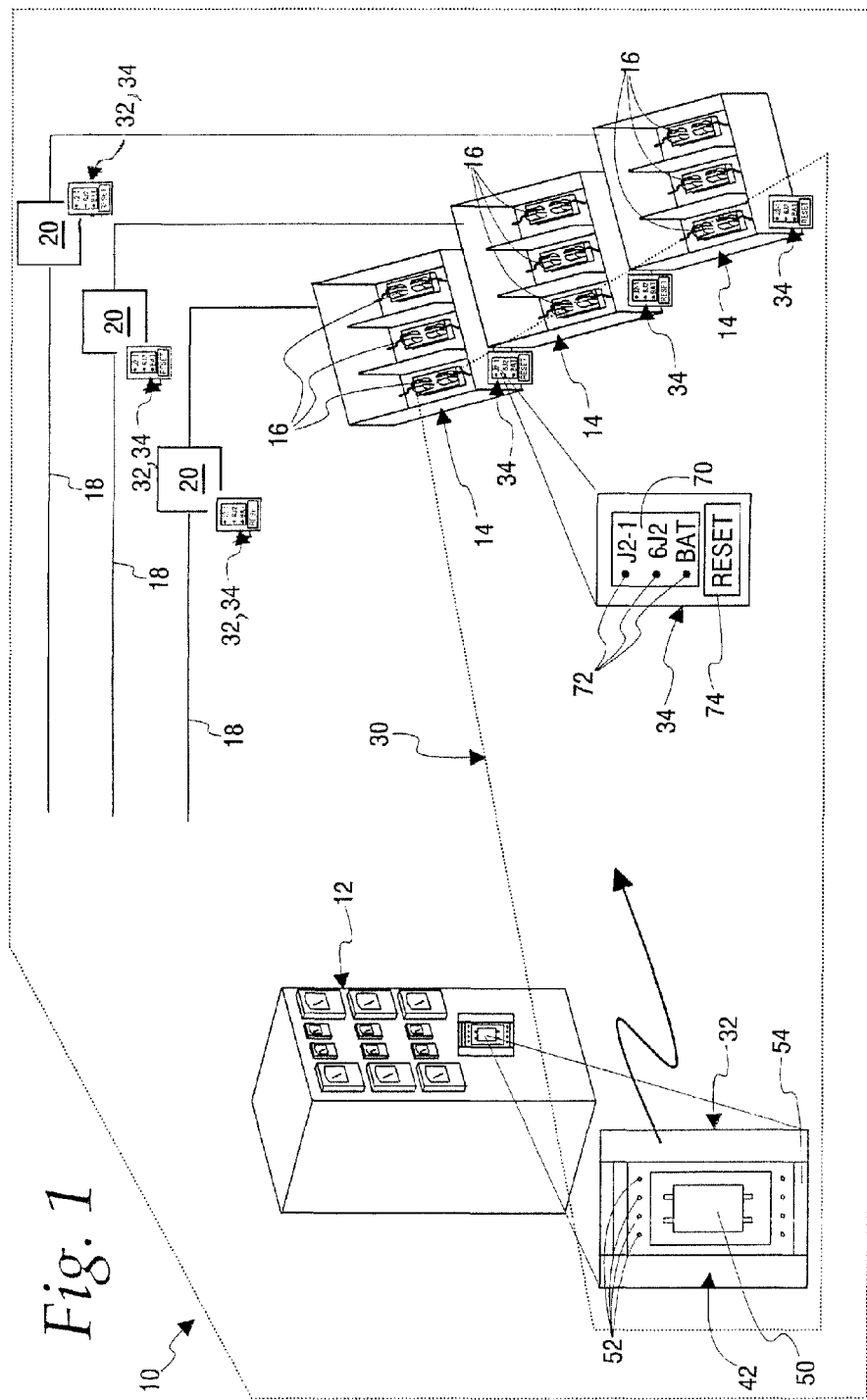
FIG. 1 is a diagrammatic representation of an indoor or hybrid distribution substation including an awareness system for use by a lineworker when executing one or more switching orders.

With reference to FIG. 1, an indoor or hybrid distribution substation 10 is shown diagrammatically and includes a protection panel 12, a plurality of disconnect panels 14 and associated three phase disconnect switches 16, feeders 18, and circuit breakers 20, as well as other potential assets that are not illustrated in FIG. 1 but that will be known to those skilled in the art. FIG. 1 also shows a situational awareness system 30 including a wireless transmitter in the form of a radio 32 located on the protection panel 12, and a plurality of wireless receivers in the form of radios 34, with each radio 34 being located adjacent a disconnect panel 14 and its associated three phase disconnect switch 16.

Figure 2:
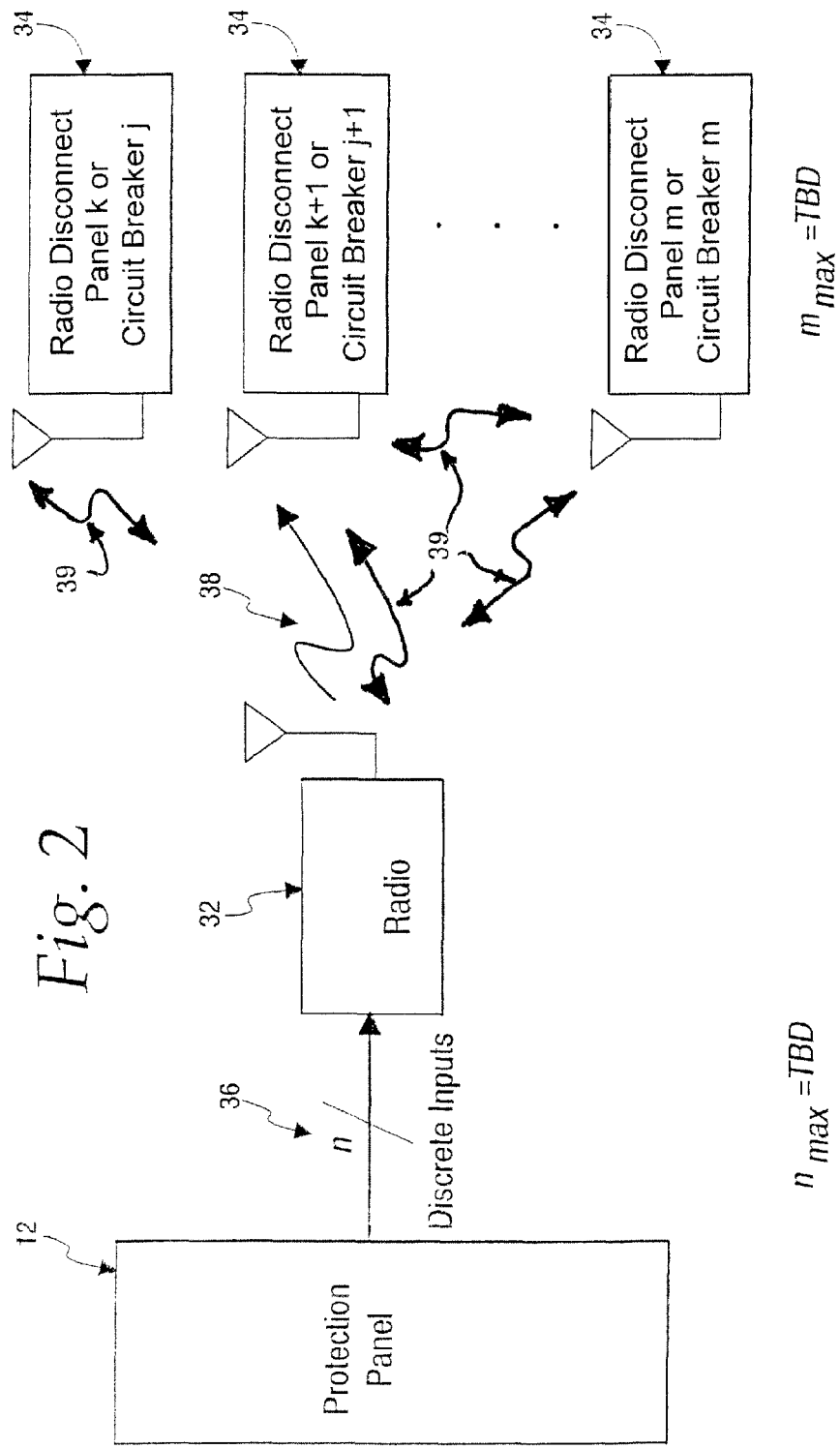
FIG. 2 is a functional diagram of the situational awareness system.

As best seen in FIG. 2, the wireless transmitter/radio 32 is connected to the protection panel 12 to receive discrete inputs or signals therefrom that indicate the status of each of the circuit breakers 20 in the subsystem 10, as illustrated at 36. In this regard, the radio 32 can be hard-wired to a terminal block (not shown) that connects the circuit breaker discrete signals (relay contacts) to the protection panel 12. The radio 32 transmits the statuses of each circuit breaker 20 (hereinafter the "circuit breaker status information") to the wireless receiver/radio 34, as illustrated at 38. In this regard, the radio 32 can transmit a data packet containing the circuit breaker status information.

Each of the wireless receivers/radios 34 can be a stand-alone device that requires no hard-wiring to any existing assets of the substation 10. Each radio 34 receives the circuit breaker status information and displays the status information for the circuit breaker 20 for the feeder 18 of the disconnect panel 14 adjacent the radio 34 to allow a lineworker to verify the status immediately prior to executing a switching order for the disconnect switch 16 (the target switch for the lineworker's switching order) associated with the disconnect panel 14. In this regard, each radio 34 can receive a data packet containing the circuit breaker status information transmitted from the wireless transmitter/radio 32 (as previously discussed) and can decode the data packet and display the status information for the circuit breaker 20 associated with the disconnect panel 14 adjacent the radio 34. In this regard, the radios 32 and 34 can have a master radio/slave radio-type architecture with the radio 32 being a master radio and the radios 34 being slave radios. As another alternative, as diagrammatically illustrated by the arrows 39 in FIG. 2, all of the radio 32 and 34 can be configured as peer-to-peer type radios with a peer-to-peer type architecture wherein each of the radios 34 are also wireless transmitters that are capable of transmitting any relative status, such as the status of the disconnect switch 16, and each of the radios 32 and 34 are capable of receiving a wireless transmission from any of the other radios 32 and 34 and determining whether the information is relevant to its particular function/purpose, such as, for example, displaying the status for the circuit breaker 20 for the feeder 18 of the disconnect panel 14 adjacent the radio 34 to allow one worker to verify the status immediately prior to executing the switching order for the disconnect switch 16 associated with the disconnect panel 14. Further in regard to a peer-to-peer type architecture, additional radios 32 or 34 could be hardwired to the circuit breakers 20 so as to transmit any relative status, such as the status of the circuit breaker 20, to the other radios 32 and 34 in the peer-to-peer network as shown in FIGS. 1 and 2.

The wireless receivers/radios 34 can be configured to display additional parameters that could be of importance to a lineworker executing a switching order. For example, each radio 34 could display a battery status for its own power supply battery, and further could display a switch identifier, such as a switch identifier number, for the disconnect switch 16 adjacent the radio 34. Further, the display could include one or more indicator lights, with specific colors indicating a safe or unsafe condition. For example, the display could include two indicator lights, one for the status of the circuit breaker 20 and one for the status of the battery powering the radio 34, with green indicating a safe condition for each status (circuit breaker open, battery charge sufficient) and red indicating an unsafe condition for each status (circuit breaker closed, battery charge insufficient). In this scenario, a lineworker would only execute the switch order if there are two green lights displayed, and would not execute the switch order if either light is red, which would indicate an unsafe condition that must be addressed prior to executing the switch order.

Figure 3:
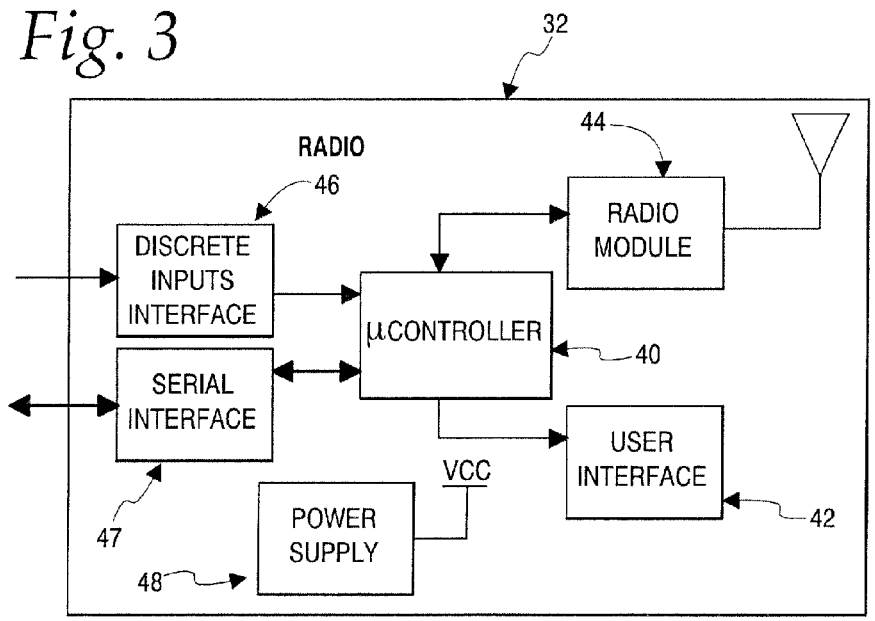
FIG. 3 is a block diagram of a radio used in the situational awareness system.

FIG. 3 shows a block diagram for a radio 32 and/or 34 for use in the system 30. In this regard, the block diagram is illustrative of a radio 32 that could be used in either a master/slave network or a peer-to-peer network, and is illustrative of a radio 34 that can be used in a peer-to-peer network. The radio 32,34 includes: a controller 40; a user interface 42 connected to the controller 40 to receive signals therefrom and, in some embodiments, send signals thereto; a radio module 44 connected to controller 40 to receive signals therefrom and, in some embodiments, to send signals thereto; a discrete signal input interface 46 connected to the controller 40 to send signals thereto; a serial interface 47 connected to the controller 40 to send signals thereto and receive signals therefrom; and a power supply 48 connected to the controller 40 and other selected components of the radio 32 to supply electric power thereto. As best seen in FIG. 1, the user interface 42 can include an LCD display 50, indicator lights 52, and input keys 54. The power supply 48 can be in the form of a battery located in the master radio 32 or a hard-wired connection to a power source in the protection panel 12. The controller 40 can be a programmable controller 40 that can be configured, in connection with the radio module 44, to convert the circuit breaker status information into a data packet that is transmitted wirelessly via the radio module 44.

Figure 4:
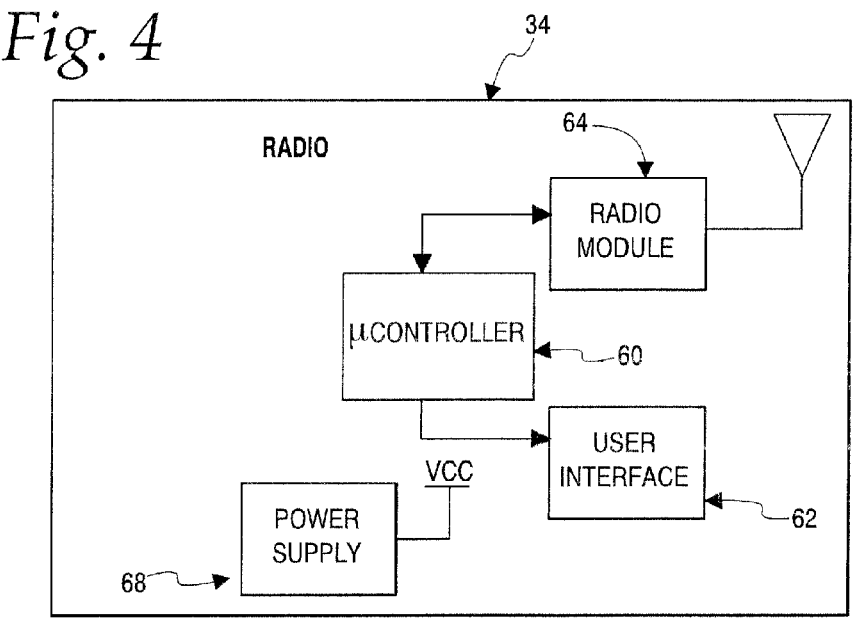
FIG. 4 is a block diagram of another radio used in some embodiments of the situational awareness system.

FIG. 4 shows a block diagram for a wireless receiver/slave radio 34 for use in the system 30 when the system 30 is configured as a master/slave-type network. The slave radio 34 includes: a controller 60; a user interface 62 connected to the controller 60 to receive signals therefrom and, in some embodiments, send signals thereto; a radio module 64 connected to controller 60 to receive signals therefrom and, in some embodiments, to send signals thereto; and a power supply 68 connected to the controller 60 and other selected components of the slave radio 34 to supply electric power thereto. The user interface 62 can include an LCD display 70 (shown in FIG. 1), indicator lights 72 (shown as part of the LCD display 70 in FIG. 1), and input keys 74 (only one shown in FIG. 1). The power supply 68 can be in the form of a battery located in the slave radio 34. The controller 60 can be a programmable controller 60 that can be configured, in connection with the radio module 64, to convert a data packet transmitted from the master radio 32 into the circuit breaker status information and, further, to determine which circuit breaker status applies to the adjacent disconnect switch 16.

In some embodiments, especially those employing battery power, each of the controllers 40 and 60 can be an ultra-low power controller, such as a Texas Instruments MSP430-based MCU.

It should be understood that the method for entering any identifiers for the disconnect switches 16 can be dependent on the data entry capabilities available at each particular substation 10.

In some embodiments, the radio network can be based on Honeywell One Wireless technology, which operates in the unlicensed 2.4 GHz ISM (Industrial Scientific and Medical) band, and can use direct sequence spread spectrum (DSSS) based on the IEEE 802.15.4-2006 standard. A frequency hopping spread spectrum (FHSS) version can also be used in some embodiments, which can be more suitable to harsh EMI environments.

It should be understood that although particular embodiments are shown herein, details of the embodiments are illustrative and many alternatives being possible according to the application depending upon the particular requirements for any particular substation and any particular customer. For example, the user interfaces 42,62 have been described herein as including an LCD display 50,70, indicator lights 52,72 and input keys 54,74, but in some embodiments, the user interface may exclude only some or only one of the specifically listed components 50,70,52,72,54,74, and/or could include other suitable user interface components, such as other suitable indicator lights, other suitable visual displays, such as, for example, plasma-type displays, and/or audio-type interfaces or displays. Accordingly, no limitations to any particular component should be read into the claims, unless expressly recited in a claim.

It should be seen that the system 30 can provide a versatile solution when direct wiring for signaling is not ideal or practical, and further can address issues associated with devices installed on high voltage assets, such as, for example, installation constraints such as minimum clearance requirements between high voltage or high current carrying conductors and earth ground.

The invention claimed is:

1. A method for providing situational awareness to a lineworker executing a switching order in a distribution substation, the method comprising the steps of:
   wirelessly transmitting a status of at least one circuit breaker in the distribution substation;
   wirelessly receiving the status at a location adjacent a target switch in the distribution substation; and
   displaying the status to a lineworker at the location to allow the lineworker to verify the status immediately prior to executing a switching order for the target switch;
   wherein the wirelessly transmitting step comprises transmitting a status for each of a plurality of circuit breakers in the distribution substation, and the displaying step comprises displaying the status for a specific circuit breaker associated with the target switch; and
   wherein the wirelessly receiving step comprises receiving the status for each of a plurality of circuit breakers at a plurality of locations by a plurality of wireless receivers, each location being adjacent one of a plurality of target switches and being associated with one wireless receiver of the plurality of wireless receivers and the displaying step comprises displaying at each location the status for a specific circuit breaker associated with the target switch adjacent the location.

2. The method of claim 1 wherein the step of wirelessly transmitting comprises transmitting the status in a data packet, and further comprising the step of the decoding the data packet to display the status at the location.

3. The method of claim 1 wherein the displaying step further comprises displaying at least one additional parameter to the lineworker at the location to allow the lineworker to verify the at least one additional parameter immediately prior to executing a switching order for the target switch.

4. The method of claim 3 wherein the displaying step comprises displaying specific colors of light for each of the status and the at least one additional parameter, each color to indicate a particular condition for each of the status and the at least one additional parameter.

5. The method of claim 1 wherein the wirelessly transmitting step comprises transmitting the statuses in a data packet, and further comprising the step of decoding the data packet at each location to display the status of the specific circuit breaker associated with the target switch adjacent the location.

6. The method of claim 1 wherein the displaying step further comprises displaying at least one additional parameter at each location to allow the lineworker to verify the at least one additional parameter immediately prior to executing a switching order for the target switch at each location.

7. The method of claim 6 wherein the displaying step comprises displaying specific colors of light at each location for the status and the at least one additional parameter associated with the location, each color to indicate a particular condition for each of the status and the at least one additional parameter.

8. A situational awareness system to provide situational awareness to a lineworker executing a switching order in a distribution substation, the situational awareness system comprising:
   a wireless transmitter to wirelessly transmit a status of at least one circuit breaker in the distribution substation; and
   a wireless receiver positioned adjacent a target switch in the distribution substation to receive the status transmitted from the wireless transmitter, the wireless receiver including a user interface configured to display the status to a the lineworker at the target switch prior to the lineworker executing a switching order for the target switch;

wherein the wireless transmitter is connected to a protection panel and configured to transmit a status for each of a plurality of circuit breakers in the distribution substation, and further comprising a plurality of wireless receivers, each wireless receiver positioned adjacent one of a plurality of target switches in the distribution substation and configured to receive and display the status for one of the plurality of circuit breakers associated with the one of a plurality of target switches.

9. The situational awareness system of claim 8 wherein the wireless transmitter is configured to transmit the status in a data packet and the wireless receiver is configured to decode the data packet to display the status to the lineworker.

10. The situational awareness system of claim 8 wherein the wireless receiver is configured to display at least one additional parameter to a lineworker at the target switch prior to the lineworker executing the switching order for the target switch.

11. The situational awareness system of claim 8 wherein the wireless transmitter is configured to transmit said statuses in a data packet and each wireless receiver of the plurality of wireless receivers is configured to decode the data packet to display the status for the one of the plurality of circuit breakers associated with the one of a plurality of target switches.

12. The situational awareness system of claim 8 wherein each wireless receiver is configures to display at least one additional parameter to a lineworker at the target switch positioned adjacent the wireless receiver.

\* \* \* \* \*